(12) United States Patent
Sim et al.

(10) Patent No.: US 12,077,101 B2
(45) Date of Patent: Sep. 3, 2024

(54) STEERING WHEEL AND DAMPER UNIT THEREOF

(71) Applicants: HYUNDAI MOTOR COMPANY, Seoul (KR); KIA CORPORATION, Seoul (KR)

(72) Inventors: Hyo Ryeol Sim, Hwaseong-si (KR); Jun Yong Min, Yongin-si (KR); Hong Joo Jung, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/101,474

(22) Filed: Jan. 25, 2023

(65) Prior Publication Data
US 2024/0075875 A1     Mar. 7, 2024

(30) Foreign Application Priority Data

Sep. 5, 2022   (KR) .......................... 10-2022-0112195

(51) Int. Cl.
| | | |
|---|---|---|
| *B60Q 5/00* | (2006.01) | |
| *B60R 21/203* | (2006.01) | |
| *B62D 1/04* | (2006.01) | |
| *H01H 13/14* | (2006.01) | |
| *H01H 13/20* | (2006.01) | |

(52) U.S. Cl.
CPC ............ *B60Q 5/003* (2013.01); *B60R 21/203* (2013.01); *B60R 21/2037* (2013.01); *B62D 1/04* (2013.01); *H01H 13/14* (2013.01); *H01H 13/20* (2013.01)

(58) Field of Classification Search
CPC ..... B60R 21/203; B60R 21/2037; B62D 1/04; H01H 13/14; H01H 13/20; B60Q 5/003
See application file for complete search history.

(56) References Cited

U.S. PATENT DOCUMENTS

| | | | | |
|---|---|---|---|---|
| 3,133,769 | A * | 5/1964 | Drake ..................... | F16C 33/22 384/145 |
| 4,445,598 | A * | 5/1984 | Brambilla ............... | F16F 9/364 188/315 |
| 4,566,855 | A * | 1/1986 | Costabile ................. | B63H 1/20 416/169 R |
| 4,916,749 | A * | 4/1990 | Urban ................ | B60G 21/0551 384/138 |

(Continued)

FOREIGN PATENT DOCUMENTS

KR          20210003428 A         1/2021

*Primary Examiner* — Timothy Wilhelm
(74) *Attorney, Agent, or Firm* — Lempia Summerfield Katz LLC

(57) ABSTRACT

A steering wheel includes a damper unit and an airbag cover configured to move, when a horn is activated, in a horn operation direction with respect to an airbag housing. The damper unit includes a damper made of insulating material coupled to the airbag housing, a switch assembly coupled to the airbag housing in an insulating state via the damper and coupled to the steering wheel to be continuously energized, and a spring. The spring is coupled to the airbag housing to be continuously energized and selectively electrically conducted with the switch assembly depending on whether the airbag cover is in contact with the switch assembly due to elastic deformation when the airbag cover moves in the horn operation direction.

9 Claims, 14 Drawing Sheets

(56) References Cited

U.S. PATENT DOCUMENTS

| | | | | |
|---|---|---|---|---|
| 5,023,412 A * | 6/1991 | Ishida | ............... | H01H 13/12 |
| | | | | 200/61.57 |
| 5,100,114 A * | 3/1992 | Reuter | ............... | F16C 27/063 |
| | | | | 267/293 |
| 5,201,679 A * | 4/1993 | Velte, Jr. | ............... | B63H 23/34 |
| | | | | 440/49 |
| 5,303,952 A * | 4/1994 | Shermetaro | ............... | B60Q 1/0082 |
| | | | | 200/61.55 |
| 5,327,796 A * | 7/1994 | Ernst | ............... | B60R 21/2037 |
| | | | | 74/484 H |
| 5,333,897 A * | 8/1994 | Landis | ............... | B60R 21/2037 |
| | | | | 200/61.54 |
| 5,342,697 A * | 8/1994 | Helle | ............... | B22F 7/062 |
| | | | | 277/922 |
| 5,410,114 A * | 4/1995 | Furuie | ............... | B60Q 5/003 |
| | | | | 200/61.55 |
| 5,508,481 A * | 4/1996 | Williams | ............... | H01H 3/122 |
| | | | | 200/61.54 |
| 5,593,178 A * | 1/1997 | Shiga | ............... | B60R 21/2037 |
| | | | | 200/61.55 |
| 5,627,352 A * | 5/1997 | Suzuki | ............... | B60Q 5/003 |
| | | | | 200/61.54 |
| 5,762,359 A * | 6/1998 | Webber | ............... | B60R 21/2035 |
| | | | | 280/728.2 |
| 5,826,901 A * | 10/1998 | Adomeit | ............... | B60R 21/2171 |
| | | | | 280/728.1 |
| 6,299,201 B1 * | 10/2001 | Fujita | ............... | B60Q 5/003 |
| | | | | 74/552 |
| 6,312,012 B1 * | 11/2001 | Bohn | ............... | B62D 1/04 |
| | | | | 200/61.54 |
| 6,457,379 B1 * | 10/2002 | Mirone | ............... | B60Q 5/003 |
| | | | | 200/61.54 |
| 6,478,330 B2 * | 11/2002 | Fujita | ............... | B60Q 5/003 |
| | | | | 74/552 |
| 6,485,241 B1 * | 11/2002 | Oxford | ............... | H04R 1/025 |
| | | | | 181/150 |
| 6,508,485 B2 * | 1/2003 | Kikuta | ............... | B60Q 5/003 |
| | | | | 200/61.54 |
| 6,554,312 B2 * | 4/2003 | Sakane | ............... | B60R 21/2037 |
| | | | | 280/728.2 |
| 6,600,114 B2 * | 7/2003 | Kikuta | ............... | B60Q 5/003 |
| | | | | 200/61.54 |
| 6,682,092 B2 * | 1/2004 | Schutz | ............... | B60Q 5/003 |
| | | | | 280/728.2 |
| 6,688,637 B2 * | 2/2004 | Igawa | ............... | B60R 21/2037 |
| | | | | 200/61.54 |
| 6,719,323 B2 * | 4/2004 | Kai | ............... | B60Q 5/003 |
| | | | | 200/61.54 |
| 6,722,227 B2 * | 4/2004 | Rabagliano | ............... | B60Q 5/003 |
| | | | | 200/61.54 |
| 6,783,150 B2 * | 8/2004 | Ahlquist | ............... | B60R 21/2035 |
| | | | | 280/728.2 |
| 6,802,531 B2 * | 10/2004 | Bohn | ............... | B60Q 5/003 |
| | | | | 280/728.2 |
| 6,860,509 B2 * | 3/2005 | Xu | ............... | B60R 21/2037 |
| | | | | 280/728.2 |
| 6,874,808 B2 * | 4/2005 | Marath | ............... | B60Q 5/003 |
| | | | | 280/728.2 |
| 6,881,911 B2 * | 4/2005 | Sugimoto | ............... | B60Q 5/003 |
| | | | | 200/61.54 |
| 6,942,247 B2 * | 9/2005 | Simpson | ............... | B60Q 5/003 |
| | | | | 200/61.57 |
| 6,995,328 B2 * | 2/2006 | Sugimoto | ............... | B60R 21/21658 |
| | | | | 200/61.54 |
| 7,077,573 B2 * | 7/2006 | Suh | ............... | F16C 33/106 |
| | | | | 384/129 |
| 7,112,754 B2 * | 9/2006 | Holzel | ............... | B60R 16/0215 |
| | | | | 200/61.54 |
| 7,159,898 B2 * | 1/2007 | Thomas | ............... | B60R 21/2037 |
| | | | | 200/61.55 |
| 7,173,202 B2 * | 2/2007 | Tsujimoto | ............... | B60R 21/2037 |
| | | | | 200/61.54 |
| 7,185,915 B2 * | 3/2007 | Fujita | ............... | B60R 21/2037 |
| | | | | 280/731 |
| 7,268,309 B2 * | 9/2007 | Sugimoto | ............... | B60R 21/21658 |
| | | | | 200/61.54 |
| 7,322,602 B2 * | 1/2008 | Tsujimoto | ............... | B60R 21/2037 |
| | | | | 200/61.54 |
| 7,360,786 B2 * | 4/2008 | Tsujimoto | ............... | B60Q 5/003 |
| | | | | 200/61.55 |
| 7,367,744 B2 * | 5/2008 | Funke | ............... | B60G 21/0551 |
| | | | | 280/124.152 |
| 7,401,789 B2 * | 7/2008 | Harer | ............... | F16J 15/3216 |
| | | | | 180/428 |
| 7,464,959 B2 * | 12/2008 | Pillsbury, IV | ............... | B60Q 5/003 |
| | | | | 200/61.55 |
| 7,469,921 B2 * | 12/2008 | Burgard | ............... | B60R 21/2037 |
| | | | | 280/728.2 |
| 7,556,281 B2 * | 7/2009 | Olesko | ............... | B60R 21/2035 |
| | | | | 280/728.2 |
| 7,690,678 B2 * | 4/2010 | Fujita | ............... | B60R 21/2037 |
| | | | | 280/731 |
| 7,784,825 B2 * | 8/2010 | Frisch | ............... | B60R 21/2035 |
| | | | | 200/61.55 |
| 7,823,908 B2 * | 11/2010 | Matsu | ............... | B60R 21/2037 |
| | | | | 280/728.2 |
| 7,976,059 B2 * | 7/2011 | Fujita | ............... | B60R 21/2037 |
| | | | | 200/61.54 |
| 8,205,908 B2 * | 6/2012 | Matsu | ............... | B60R 21/2035 |
| | | | | 280/728.2 |
| 8,263,850 B2 * | 9/2012 | Hashimoto | ............... | G10H 1/32 |
| | | | | 84/723 |
| 8,342,567 B2 * | 1/2013 | Sasaki | ............... | B60Q 5/003 |
| | | | | 200/61.55 |
| 8,419,052 B2 * | 4/2013 | Yamaji | ............... | B60R 21/2037 |
| | | | | 280/728.2 |
| 8,459,686 B2 * | 6/2013 | Suzuki | ............... | B60R 21/2037 |
| | | | | 200/61.54 |
| 8,500,156 B2 * | 8/2013 | Banno | ............... | B60R 21/2037 |
| | | | | 280/728.2 |
| 8,556,292 B2 * | 10/2013 | Umemura | ............... | B62D 7/222 |
| | | | | 280/731 |
| 8,567,818 B2 * | 10/2013 | Umemura | ............... | B60R 21/203 |
| | | | | 280/728.2 |
| 8,616,577 B1 * | 12/2013 | Matsu | ............... | B60R 21/2037 |
| | | | | 280/728.2 |
| 8,720,942 B2 * | 5/2014 | Onohara | ............... | B60R 21/2037 |
| | | | | 74/552 |
| 8,733,203 B2 * | 5/2014 | Kondo | ............... | B60Q 5/003 |
| | | | | 74/552 |
| 8,794,662 B2 * | 8/2014 | Ishii | ............... | B60R 21/2037 |
| | | | | 280/728.2 |
| 8,827,558 B2 * | 9/2014 | Heintschel | ............... | F16J 15/3236 |
| | | | | 384/16 |
| 8,851,512 B2 * | 10/2014 | Umemura | ............... | B60R 21/203 |
| | | | | 280/731 |
| 8,919,812 B2 * | 12/2014 | Schutz | ............... | B60R 21/2037 |
| | | | | 280/728.2 |
| 8,939,466 B2 * | 1/2015 | James | ............... | B60R 21/2037 |
| | | | | 280/731 |
| 8,985,623 B2 * | 3/2015 | Kondo | ............... | F16F 7/1028 |
| | | | | 280/731 |
| 9,016,719 B2 * | 4/2015 | Amamori | ............... | B60R 21/203 |
| | | | | 280/731 |
| 9,085,278 B2 * | 7/2015 | Kiuchi | ............... | B60R 21/2037 |
| 9,139,150 B2 * | 9/2015 | Oh | ............... | B60R 21/2037 |
| 9,156,400 B2 * | 10/2015 | Ishii | ............... | B60R 21/2037 |
| 9,195,257 B2 * | 11/2015 | Miyahara | ............... | G05G 1/10 |
| 9,365,177 B2 * | 6/2016 | Bachmann | ............... | B60R 21/203 |
| 9,366,311 B2 * | 6/2016 | Gustavsson | ............... | F16F 15/08 |
| 9,550,525 B2 * | 1/2017 | Ishii | ............... | B60R 21/21658 |
| 9,561,772 B2 * | 2/2017 | Andersson | ............... | B60R 21/2037 |
| 9,725,063 B2 * | 8/2017 | Collazo | ............... | B60Q 5/003 |
| 9,783,147 B2 * | 10/2017 | Spencer | ............... | B60R 21/2035 |
| 10,023,221 B2 * | 7/2018 | Obayashi | ............... | B62D 7/222 |
| 10,024,359 B2 * | 7/2018 | Westnedge | ............... | F16F 1/3835 |
| 10,099,642 B2 * | 10/2018 | Bachmann | ............... | F16B 19/004 |
| 10,196,028 B2 * | 2/2019 | Yamami | ............... | B60R 21/2037 |

(56) References Cited

U.S. PATENT DOCUMENTS

| | | | |
|---|---|---|---|
| 10,315,605 B2* | 6/2019 | Ishii | B60R 21/2037 |
| 10,351,089 B2* | 7/2019 | Ishii | B60R 21/2037 |
| 10,377,335 B2* | 8/2019 | Ishii | B60R 21/2035 |
| 10,406,975 B2* | 9/2019 | Obayashi | B60Q 5/003 |
| 10,875,564 B2* | 12/2020 | Minami | B62D 7/222 |
| 10,913,420 B2* | 2/2021 | Ishii | B60R 21/2037 |
| 10,926,698 B2* | 2/2021 | Gothekar | B62D 7/222 |
| 11,027,765 B2* | 6/2021 | Ko | F16F 15/085 |
| 11,161,472 B2* | 11/2021 | Schütz | B60Q 5/003 |
| 11,305,716 B2* | 4/2022 | Hirota | B60R 21/21656 |
| 11,383,751 B2* | 7/2022 | Kim | B60R 21/2037 |
| 11,511,695 B2* | 11/2022 | Hayakawa | B60R 21/203 |
| 11,518,334 B2* | 12/2022 | Mills | B60R 21/215 |
| 11,634,166 B2* | 4/2023 | Nagata | B62D 1/11 280/731 |
| 11,731,575 B2* | 8/2023 | Sasaki | B60R 21/203 280/728.2 |
| 2002/0079678 A1* | 6/2002 | Kai | B60R 21/21656 280/743.2 |
| 2004/0178611 A1* | 9/2004 | Simpson | B60R 21/2037 280/731 |
| 2004/0227332 A1* | 11/2004 | Scherer | B60R 21/2037 280/728.2 |
| 2005/0012311 A1* | 1/2005 | Schneider | B60Q 5/003 280/731 |
| 2005/0227525 A1* | 10/2005 | Sugimoto | B60R 21/2037 439/266 |
| 2005/0230943 A1* | 10/2005 | Thomas | B60R 21/2037 200/61.55 |
| 2009/0218739 A1* | 9/2009 | Terada | B60R 21/2037 267/136 |
| 2010/0130078 A1* | 5/2010 | Okabe | F16D 3/66 440/75 |
| 2010/0219621 A1* | 9/2010 | Sasaki | B60Q 5/003 280/731 |
| 2011/0120258 A1* | 5/2011 | Kondo | B60Q 5/003 74/552 |
| 2013/0026741 A1* | 1/2013 | Onohara | B60R 21/2037 74/552 |
| 2013/0076011 A1* | 3/2013 | Umemura | B62D 7/222 280/728.2 |
| 2014/0131982 A1* | 5/2014 | Ishii | B60R 21/2037 280/728.2 |
| 2016/0031480 A1* | 2/2016 | Ishii | B60Q 5/003 280/731 |
| 2017/0361801 A1* | 12/2017 | Banno | B60R 21/2037 |

\* cited by examiner

STEERING WHEEL AND DAMPER UNIT THEREOF

CROSS REFERENCE TO RELATED APPLICATION

The present application claims priority to Korean Patent Application No. 10-2022-0112195, filed on Sep. 5, 2022, the entire contents of which are incorporated herein for all purposes by this reference.

BACKGROUND

Field of the Disclosure

The present disclosure relates to a steering wheel and, more particularly, to a steering wheel that secures degrees of freedom in the space of the steering wheel by integrating a horn switch structure and a damper structure. The integrated horn switch structure and damper structure improve horn operability by allowing only an airbag cover to move without an entire airbag module moving when a horn is activated.

Description of the Related Art

When a vehicle is driven or an engine idles, a steering wheel vibrates due to excitation forces transmitted from the engine and tires.

If the steering wheel vibration is excessive, a feeling of discomfort arises and deteriorates the vehicle's marketability, which is problematic.

As a way to fix a vibrating (e.g., shaking) steering wheel, a damper may be additionally applied to the steering wheel.

However, when the damper is added to the steering wheel, due to a lack of space inside the steering wheel, the degrees of freedom in the space between the steering wheel and a driver seat airbag decreases. Thus, there is a limit to the effect of reducing vibration since the damper mass may not be able to be increased beyond a certain level.

An airbag module of the driver seat airbag is configured such that an airbag cushion and an inflator are built into an airbag housing and is assembled in a shape in which an airbag cover is covered in the airbag housing.

A horn switch for regulating the power applied to a horn is provided between the airbag module and the steering wheel. Additionally, a spring is installed at the bottom of the airbag module to elastically support the airbag module.

Thus, when the horn is operated, according to the driver's will, the airbag module moves downward with respect to the steering wheel, and the horn switch is turned on, thereby generating a sound.

A problem with the conventional driver seat airbag, however, is that when the horn is activated, the airbag module also moves, so that when a horn wire under the airbag module is misaligned, the horn may not operate properly due to interference of the horn wire.

The content described as the related art above is only to enhance understanding of the background of the present disclosure. The content should not be taken as an acknowledgment that it corresponds to the prior art known to those having ordinary skill in the art.

SUMMARY

Accordingly, the present disclosure has been made keeping in mind the above problems occurring in the related art.

The present disclosure is intended to provide a steering wheel that secures the degrees of freedom in the space of the steering wheel by integrating a horn switch structure and a damper structure.

An objective of the present disclosure is to provide a steering wheel that improves horn operability whereby operating a horn moves only an airbag cover without moving an entire airbag module.

In order to achieve the above objective, according to an embodiment of the present disclosure, a steering wheel is provided. The steering wheel includes an airbag cover and a damper unit. the air bag cover is configured to move, when a horn is activated, in a horn operation direction with respect to the airbag housing; and a damper unit. The damper unit includes a damper made of an insulating material and coupled to an airbag housing, a switch assembly coupled to the airbag housing in an insulating state via the damper and coupled to the steering wheel so as to be continuously energized, and a spring. The spring is coupled to the airbag housing to be continuously energized and selectively electrically conducted with the switch assembly depending on whether or not the airbag cover is in contact with the switch assembly due to elastic deformation when the airbag cover moves in the horn operation direction.

The damper may be coupled to the airbag housing by penetrating the airbag housing and the switch assembly may be coupled to the damper by penetrating the damper.

The damper mounting hole may be provided in a bottom surface of the airbag housing and the damper may be inserted into the damper mounting hole. Upper and lower insulating parts may be provided by being expanded on upper and lower edges of the damper in radial directions to be supported on upper and lower ends of the damper mounting hole, respectively.

The switch assembly may include an electric conduction pin supported on an underside of the damper by expanding a flange in a radial direction. The flange may have an upper end passing through the damper and a lower end of the flange may be connected to the steering wheel. The switch assembly may also include an electric conduction connection member coupled to the upper end of the flange so as to be supported on an upper side of the damper and to which the spring that is elastically deformable is selectively contacted.

Assembly mounting holes may be formed on a bottom surface of the steering wheel while being spaced out radially angularly so that the switch assembly is inserted into each of the respective assembly mounting holes. A fastening groove may be formed on an outer surface of the switch assembly and a ring spring may be fitted over the fastening groove to provide an elastic force for pushing the switch assembly in an outer radial direction.

A support stopper may be provided by protruding from an upper edge of each of the assembly mounting holes in the outer radial direction.

The spring may be configured in a shape of a leaf spring.

The spring may include a base part supported between a bottom surface of the airbag housing and the damper, and an elastic deformation part. The elastic deformation part may be configured to be inclined in an upward direction toward the airbag cover at an end of the base part and to be pressed by the airbag cover so as to be elastically deformed vertically around the end of the base part.

A contact part may be provided by being bent in a shape protruding toward the base part in the middle of the elastic deformation part so as to come into contact with the switch assembly positioned between the base part and the elastic deformation part.

A pressing protrusion may be provided on an inner surface of the airbag cover. A space between the pressing protrusion and the spring may be configured to be opened to press the spring by the pressing protrusion.

A hook may be provided on an edge of the airbag housing, and a hooking hole may be provided at a position of the airbag cover corresponding to the hook so that the hook is fitted into the hooking hole. The height of the hooking hole may be configured to be longer than a cross-sectional height of the hook that fits into the hooking hole so that the airbag cover moves up and down.

A damper unit of a steering wheel according to the present disclosure includes: a damper made of an insulating material and coupled to an airbag housing; a switch assembly coupled to the airbag housing in an insulating state via the damper and coupled to the steering wheel so as to be continuously energized; and a spring. The spring is coupled to the airbag housing to be continuously energized and selectively electrically conducted with the switch assembly depending on whether or not the airbag cover is in contact with the switch assembly due to elastic deformation when the airbag cover moves in a horn operation direction.

According to embodiments of the present disclosure, since a horn switch structure includes a switch assembly, a spring, and a damper structure for damping vibrations, which are integrated into a damper unit, there is no need to install a separate damper. Thus, the degrees of freedom in the space of a steering wheel can be secured and cost can be reduced. In addition, noise-vibration-harshness (NVH) performance can be improved by ensuring excellent damping performance without additional dampers.

Furthermore, by operating a horn by moving only an airbag cover without moving an entire airbag module, the interference between the airbag module and a horn wire is fundamentally prevented, thereby improving horn operability.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
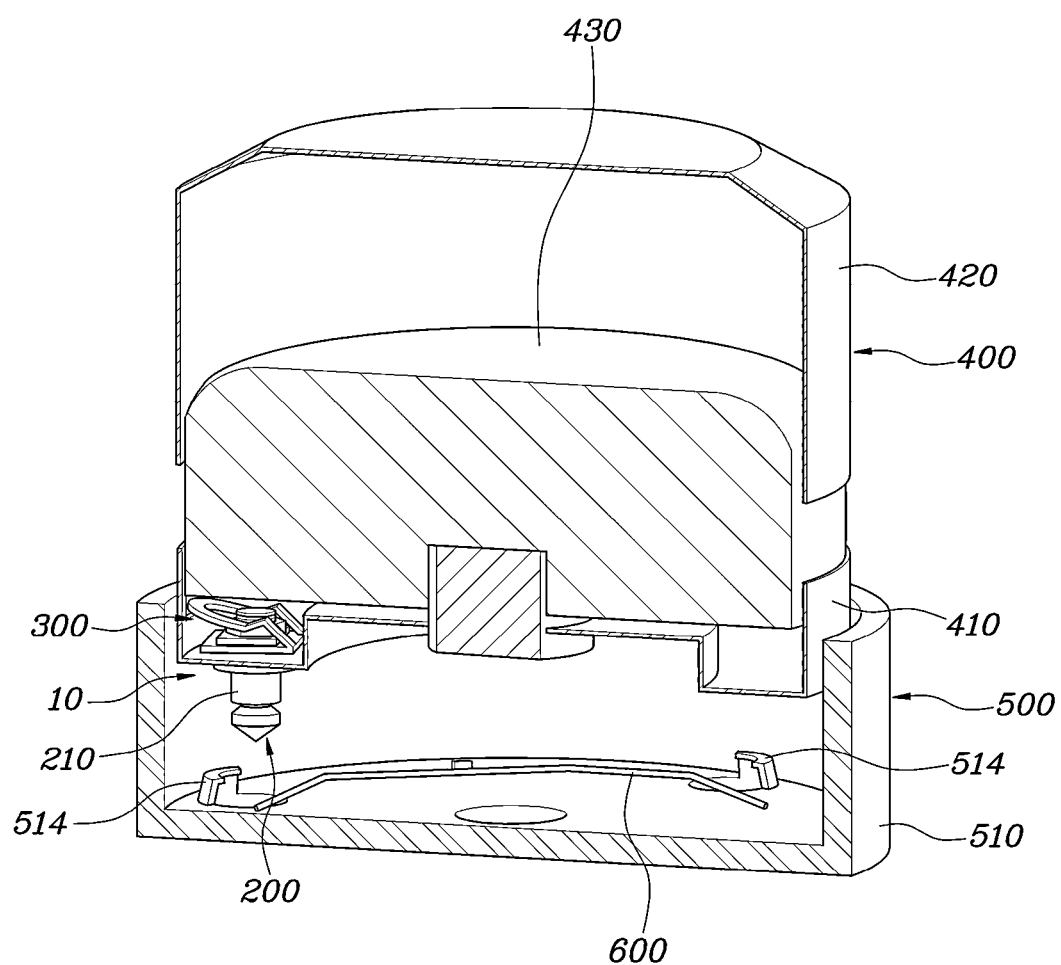
FIG. 1 is a cross-sectional view illustrating a state before assembling an airbag housing and an airbag cover according to the present disclosure.

Hereinafter, embodiments disclosed in the present specification are described in detail with reference to the accompanying drawings. The same or similar elements are assigned the same reference numerals in the drawings and overlapping descriptions thereof have been omitted.

The suffixes "module" and "part" for the elements used in the following description are given in consideration of only the ease of writing the specification, and do not have distinct meanings or roles by themselves.

In describing the embodiments disclosed in this specification, where it has been determined that detailed descriptions of related known technologies may obscure the gist of the embodiments disclosed in this specification, the detailed descriptions thereof have been omitted. In addition, it should be understood that the accompanying drawings are only to help understand the embodiments disclosed in the present specification, and the technical idea disclosed in the present specification is not limited by the accompanying drawings. The disclosure covers all changes, equivalents, and substitutes within the spirit and scope of the present inventive concept.

Terms including an ordinal number, such as first, second, and the like, may be used to describe various elements, but the elements are not limited by the terms. These terms are used only for the purpose of distinguishing one element from another.

When an element is referred to as being "connected" to another element, it should be understood that the other element may be directly connected to the other element, but other element(s) may exist in between. On the other hand, when it is said that a certain element is "directly connected" to another element, it should be understood that no other element is present in the middle.

The singular expression includes the plural expression unless the context clearly dictates otherwise.

In this specification, the terms "comprise", "include", or "have" and variations thereof are intended to indicate that there is a feature, number, step, action, element, part, or combination thereof described in the specification. It is to be understood that the present disclosure does not exclude the possibility of the presence or the addition of one or more other features, numbers, steps, actions, elements, parts, or combinations thereof. When a component, device, element, or the like of the present disclosure is described a having a purpose or performing an operation, function, or the like, the component, device, or element should be considered herein as being "configured to" meet that purpose of perform that operation or function.

Before describing the embodiments of the present disclosure in detail, the coupling relationship between an airbag module 400 and a steering wheel 500 is briefly described. An armature body 510 is formed in the center of the steering wheel 500, and the airbag module 400 is coupled to the armature body 510.

The airbag module 400 is configured to include an airbag housing 410, an airbag cushion 430, which includes an inflator, and an airbag cover 420. The airbag cushion 430 and the inflator are built in the airbag housing 410, and the airbag cover 420 covers the open upper surface of the airbag housing 410.

Figure 2:
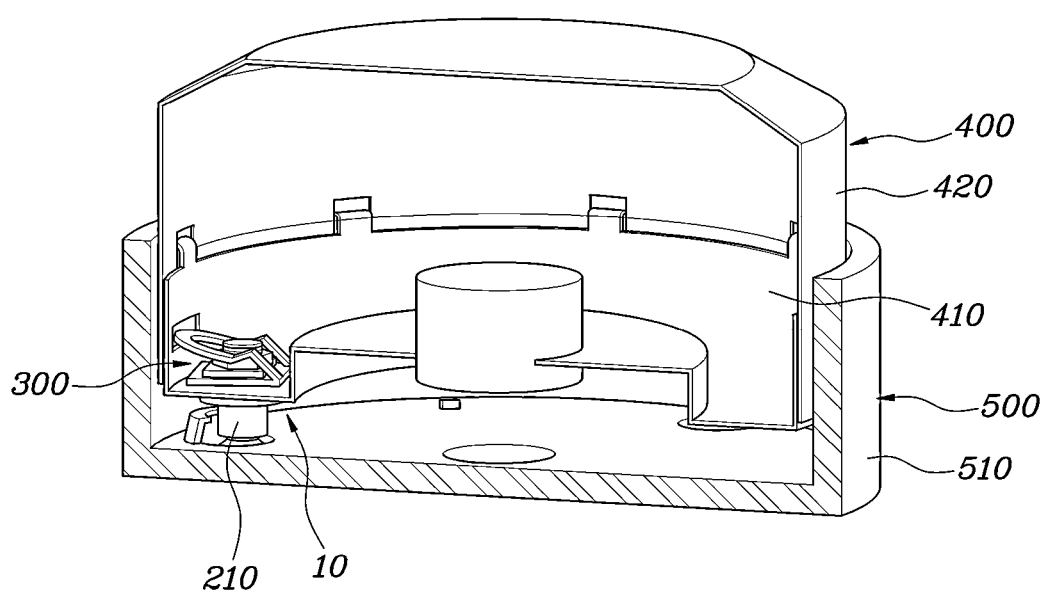
FIG. 2 is a cross-sectional view illustrating an airbag module assembled to a steering wheel according to the present disclosure.

The present disclosure relates to a structure in which a damper unit 10, in which a damper 100 and a horn switch are integrated, is installed in the steering wheel 500. FIG. 1 is a cross-sectional view illustrating a state before assembling an airbag housing 410 and the airbag cover 420 according to the present disclosure. FIG. 2 is a cross-sectional view illustrating the airbag module 400 assembled to the steering wheel 500 according to the present disclosure.

Referring to FIGS. 1 and 2, the steering wheel 500 of the present disclosure includes the airbag cover 420 and a damper unit 10. The airbag cover 420 is configured to move, when a horn is activated, in the horn operation direction (axial direction) with respect to the airbag housing 410. The damper unit 10 may include the damper 100 made of insulating material and coupled to the airbag housing 410 and may include a switch assembly 200 coupled to the airbag housing 410 in an insulating state via the damper 100 and coupled to the steering wheel 500 so as to be continuously energized. The damper unit 10 may further include a spring 300 coupled to the airbag housing 410 to be continuously energized. The spring 300 may also be selectively electrically conducted with the switch assembly 200 depending on whether or not the airbag cover 420 is in contact with the switch assembly 200 due to elastic deformation when the airbag cover 420 moves in the horn operation direction.

More specifically, the damper unit 10 is coupled between the airbag housing 410 and the armature body 510 so that the airbag housing 410, including the airbag cushion 430 and the inflator, is installed in a fixed state. Additionally, only the airbag cover 420 is reciprocated up and down with respect to the airbag housing 410. In other words, when the horn is activated, only the airbag cover 420 moves downward.

The damper 100, which may be made of rubber, is coupled between the airbag housing 410 and the switch assembly 200 to damp vibrations transmitted from the steering wheel 500 to the airbag module 400.

In addition, the switch assembly 200, the airbag housing 410, and the armature body 510 of the steering wheel 500 may be made of metal. The switch assembly 200 is insulated from the airbag housing 410 by the damper 100 and is assembled with the armature body 510 in a state of being continuously energized.

The spring 300 may also be made of a metal material and is in contact with the airbag housing 410 in a state of being continuously energized. Furthermore, the spring 300 is selectively in contact with the switch assembly 200 to be in an energized state.

In other words, when the horn is operated according to the downward movement of the airbag cover 420, as the spring 300 is elastically deformed, a portion of the spring 300 comes into contact with the switch assembly 200 so that the spring 300 and the switch assembly 200 are energized. At this time, a horn wire (not shown) may be connected to the airbag housing 410.

Accordingly, an electric signal for operating the horn flows through the airbag housing 410, the spring 300, the switch assembly 200, and the steering wheel 500 via the horn wire, thereby generating the sound of the horn.

As such, according to the present disclosure, since the horn switch structure includes the switch assembly 200, the spring 300, and the damper 100 for damping vibrations, which are all integrated into the damper unit 10, there is no need to install a separate damper. Furthermore, the degrees of freedom in the space of the steering wheel 500 may be secured and cost may be reduced. In addition, noise-vibration-harshness (NVH) performance may be improved by ensuring excellent damping performance without additional dampers.

Furthermore, by operating the horn by moving only the airbag cover 420 without moving the entire airbag module 400, the interference between the airbag module 400 and the horn wire is fundamentally prevented, thereby improving the operability of the horn.

Figure 3:
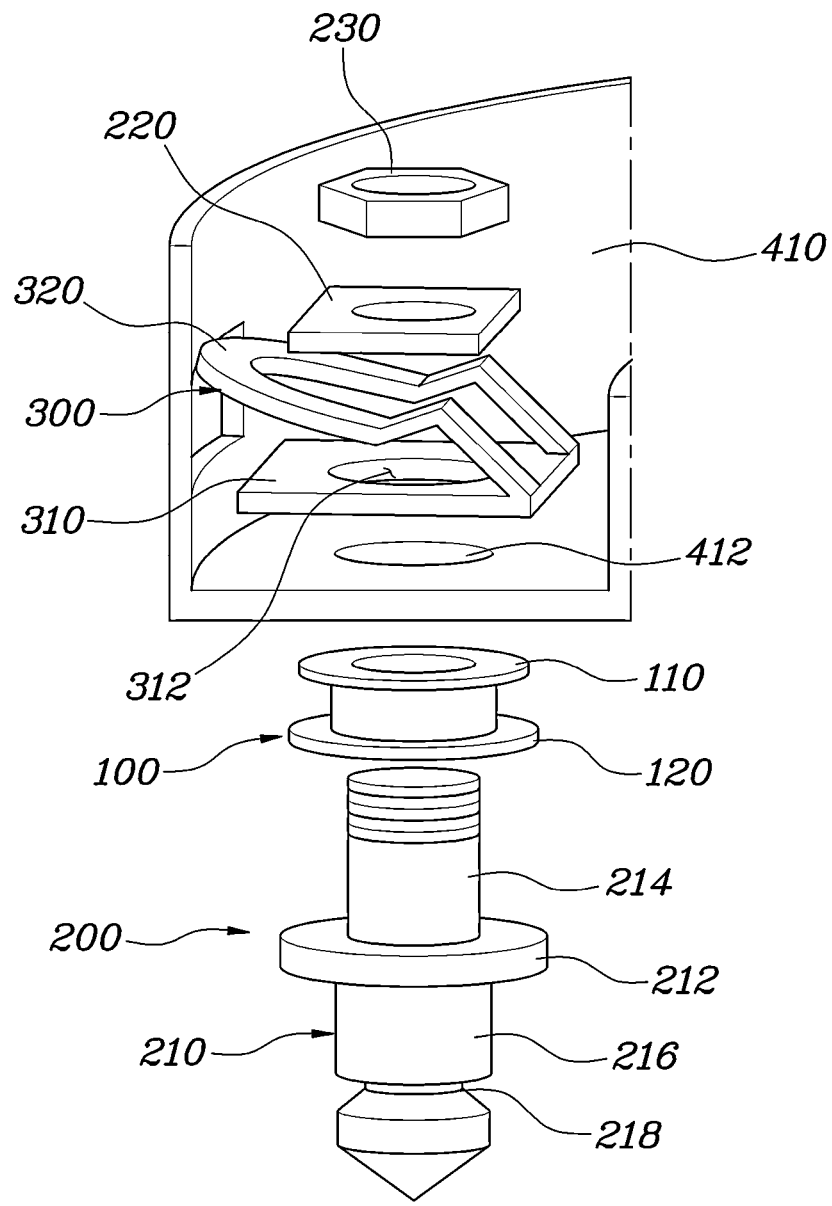
FIG. 3 is a view illustrating a switch assembly according to the present disclosure.

FIG. 3 is a separated or exploded view illustrating the switch assembly 200 according to the present disclosure.

Referring to FIG. 3, the damper 100 may be coupled to the airbag housing 410 by passing through the airbag housing 410 vertically. The switch assembly 200 may be coupled to the damper 100 by passing through the damper 100 vertically.

In other words, the damper 100 is assembled by vertically penetrating the bottom edge of the airbag housing 410 and the switch assembly 200 is assembled by vertically penetrating the middle portion of the damper 100.

As such, by assembling the damper 100 between the airbag housing 410 and the switch assembly 200, vibrations transmitted to the airbag module 400 through the steering wheel 500 and the switch assembly 200 are effectively attenuated by the damper 100.

The coupling structure between the damper 100 and the airbag housing 410 is described in more detail. A damper mounting hole 412 is formed in the bottom surface of the airbag housing 410, and the damper 100 is inserted into the damper mounting hole 412. A upper insulating part 110 and a lower insulating part 120 of the damper 100 are formed expanded at the upper and lower edges of the damper 100 in the radial direction and are respectively supported at the upper and lower ends of the damper mounting hole 412.

In other words, the damper 100 is formed in a cylindrical shape so that the outer peripheral surface of the body portion in the middle of the damper 100 abuts against the inner peripheral surface of the damper mounting hole 412 and is thus fitted.

The upper insulating part 110 formed at the upper end of the damper 100 is supported on the upper edge of the damper mounting hole 412. Additionally, an electric conduction connection member 220, described below, is supported on the upper insulating part 110, while the lower insulating part 120 formed at the lower end of the damper 100 is supported by the lower edge of the damper mounting hole 412. Furthermore, a flange 212 of an electric conduction pin 210, described below, is supported on the lower insulating part 120.

Accordingly, the airbag housing 410 and the switch assembly 200 may be assembled in an insulated state.

In addition, referring to FIG. 3, the switch assembly 200 may include the electric conduction pin 210 supported on the bottom surface of the damper 100 by expanding the flange 212 in the radial direction. The upper end portion of the flange 212 is provided through the damper 100 and the lower end portion of the flange 212 is connected to the steering wheel 500. The switch assembly 200 may further include the electric conduction connection member 220 that is coupled to the upper end portion of the flange 212 to be supported on the upper surface of the damper 100 and with which the elastically deformable spring 300 is selectively in contact.

For example, the electric conduction pin 210 is formed to elongate in the vertical direction and the flange 212 is formed to protrude from the outer peripheral surface of the middle portion of the electric conduction pin 210. A fixing part 214 formed on the upper end of the flange 212 is formed to protrude toward the airbag cover 420 and a pin part 216 formed on the lower end of the flange 212 is formed to protrude toward the armature body 510 of the steering wheel 500.

The electric conduction connection member 220 is formed in a washer shape and is supported on the upper insulating part 110 of the damper 100 while being inserted into the fixing part 214 of the electric conduction pin 210. A screw thread is formed on the upper end of the electric conduction pin 210, and a nut 230 is attached and tightened, whereby the electric conduction connection member 220 is firmly supported on the upper insulating part 110.

In addition, the spring 300 is elastically deformed to contact the upper surface of the electric conduction connection member 220.

Figure 4:
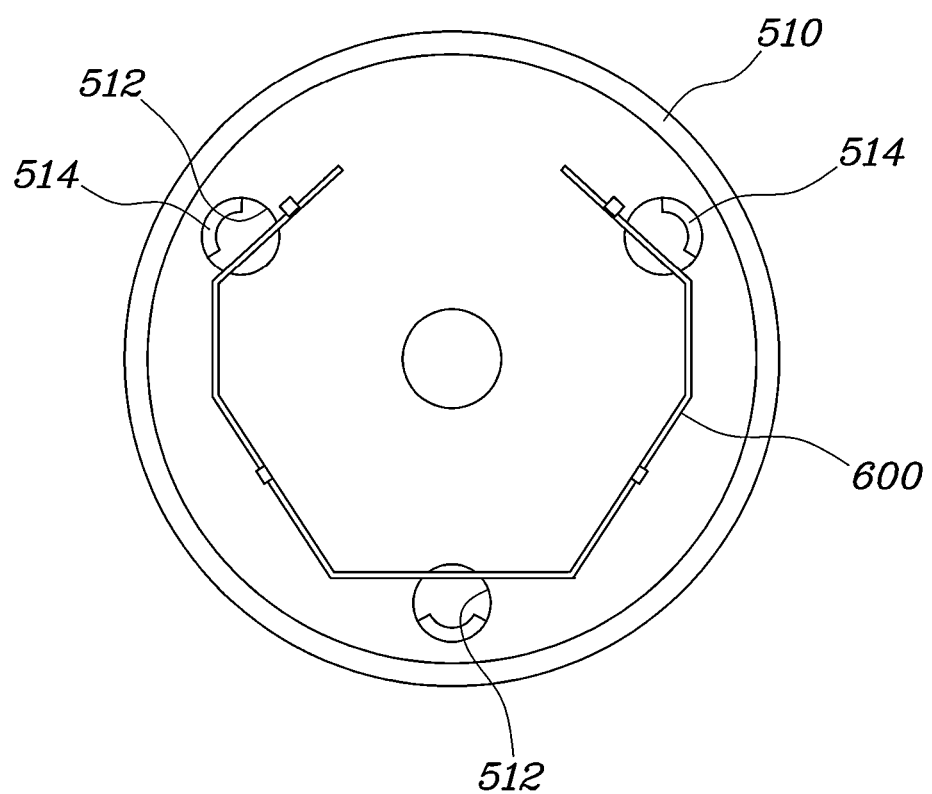
FIG. 4 is a view illustrating the shape of a ring spring according to the present disclosure.

FIG. 4 is a view illustrating the shape of a ring spring according to the present disclosure.

Referring to FIGS. 1 and 4, assembly mounting holes 512 are formed radially around the bottom surface of the steering wheel 500 so that the switch assembly 200 is inserted. Fastening groove 218 is formed on the outer surface of the switch assembly 200. A ring spring 600 is inserted into the fastening groove 218 to provide an elastic force for pushing the switch assembly 200 in an outer radial direction.

For example, three assembly mounting holes 512 are formed through the bottom surface of the armature body 510 at an equal angle and the pin part 216 formed in the switch assembly 200 is inserted into each assembly mounting hole 512.

The fastening groove 218 is formed along the periphery of the outer circumferential surface of the pin part 216. The fastening groove 218 is positioned approximately horizontally with the bottom surface of the armature body 510. Additionally, the ring spring 600 is provided on the bottom surface of the armature body 510 from the inside of the pin part 216 of each of the switch assemblies 200 and is fitted into the fastening groove 218.

Accordingly, by applying a force to push the switch assembly 200 in the outer radial direction by the elastic force of the ring spring 600, the switch assembly 200 is coupled to the armature body 510.

In addition, by forming a support stopper 514 with a protruding shape in the outer radial direction of the upper edge of the assembly mounting hole 512, it is possible to prevent the switch assembly 200 from being pushed in the outer radial direction in case the elastic force of the ring spring 600 is excessive. For reference, the support stopper 514 may be additionally formed between the assembly mounting holes 512 that are adjacent to each other.

Figure 5:
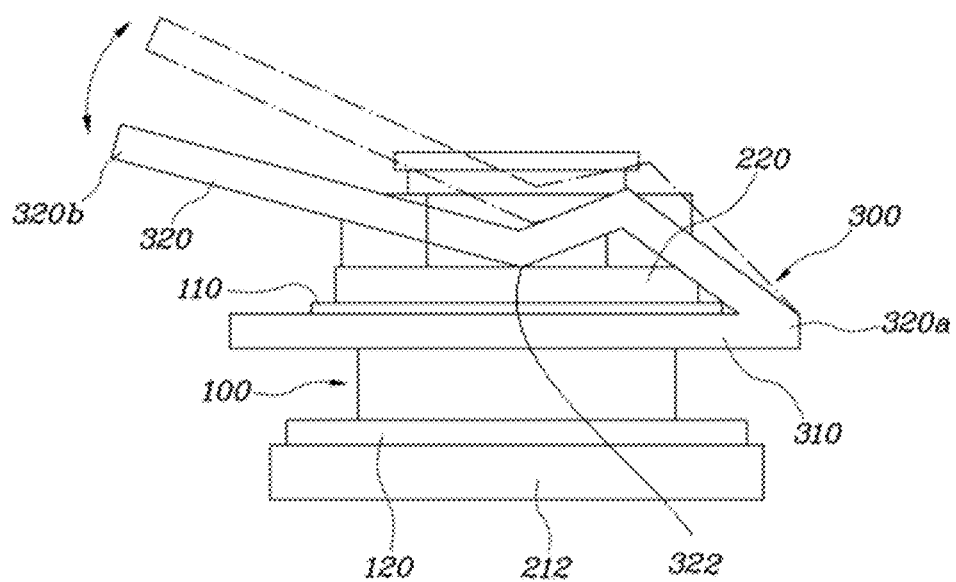
FIG. 5 is a view illustrating the form of a spring according to the present disclosure before and after an elastic deformation operation.

FIG. 5 is a view illustrating the form of the spring 300 according to the present disclosure before and after an elastic deformation operation.

Referring to FIG. 5, the spring 300 may be formed in a leaf spring shape.

To be specific, the spring 300 may include: a base part 310 supported between the bottom surface of the airbag housing 410 and the damper 100; and an elastic deformation part 320 formed to be inclined in an upward direction toward the airbag cover 420 at the end of the base part 310. The elastic deformation part 320 may be configured to be pressed by the airbag cover 420 so as to be elastically deformed vertically around the end of the base part 310.

In other words, the base part 310 is formed in a plate shape and the bottom of the base part 310 is supported on the bottom surface of the airbag housing 410. In addition, a damper support hole 312 is formed in the center of the base part 310 and the damper support hole 312 is positioned to correspond to the damper mounting hole 412. Accordingly, the upper insulating part 110 of the damper 100 passes through the damper mounting hole 412 and is supported on the upper edge of the damper support hole 312.

The elastic deformation part 320 is integrally formed in a shape inclined upward toward the outside of the airbag housing 410 at the end (a fixed end 320a) of the base part 310 toward the center of the airbag housing 410.

Thus, when the horn is operated, as the airbag cover 420 moves downward, the elastic deformation part 320 is pressed while rotating downward around the fixed end 320a where the base part 310 and the elastic deformation part 320 meet. When the operation of the horn is released, as the airbag cover 420 restores to its original position and moves upward, the elastic deformation part 320 rotates upward around the fixed end 320a to return to the state before the horn operation.

Moreover, in the middle of the elastic deformation part 320, a contact part 322 is formed to be bent in a shape protruding toward the base part 310. The contact part 322 may come into contact with the switch assembly 200 that is positioned between the base part 310 and the elastic deformation part 320.

For example, the elastic deformation part 320 may be formed in an "N" shape so that the middle portion thereof simultaneously protrudes upward and downward and so that the part protruding downward becomes the contact part 322.

In addition, since the electric conduction connection member 220 is provided between the base part 310 and the elastic deformation part 320, when the elastic deformation part 320 moves downward, the contact part 322 comes into contact with the electric conduction connection member 220. Thus, the contact part 322 is electrically conducted with the airbag housing 410 to operate the horn.

Figure 6:
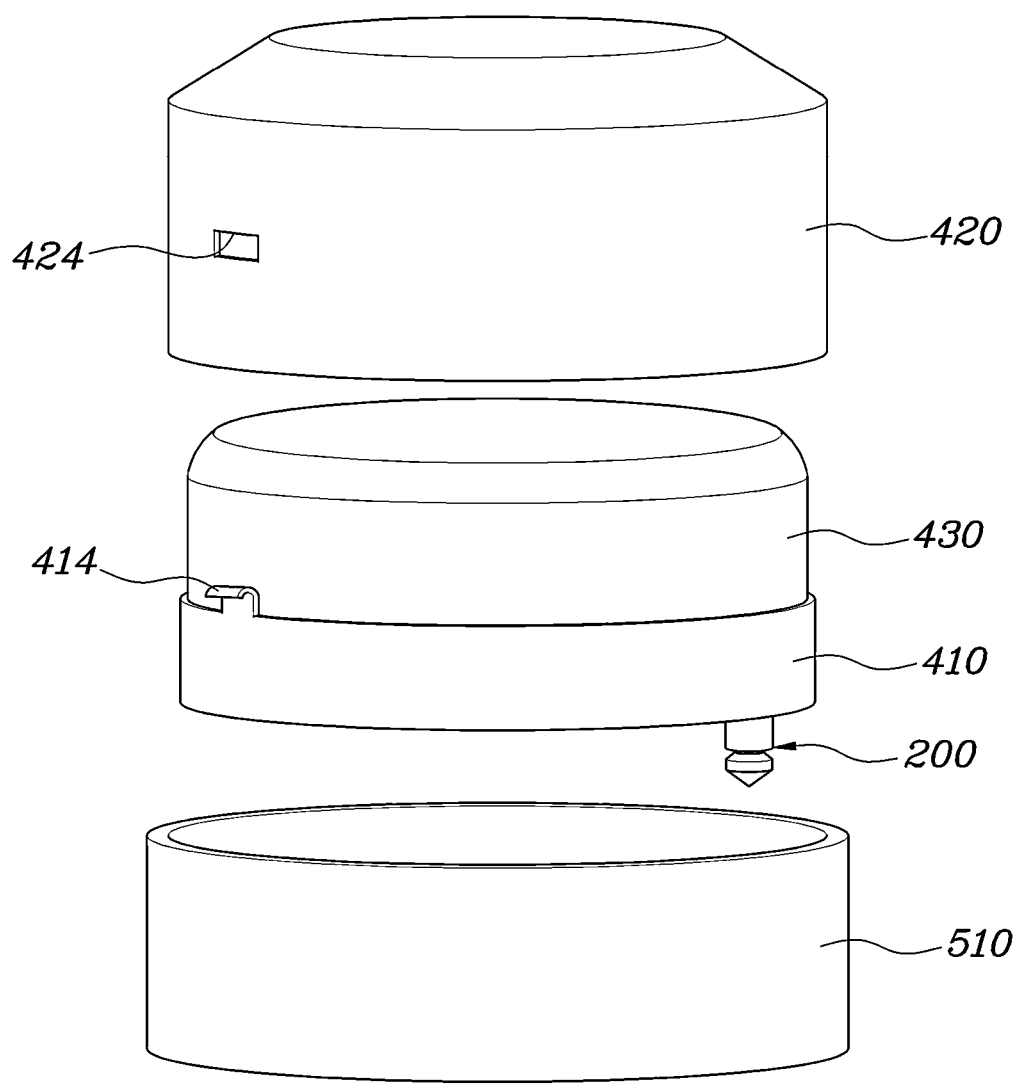
FIG. 6 is a view illustrating a separated airbag module according to the present disclosure.
Figure 7:
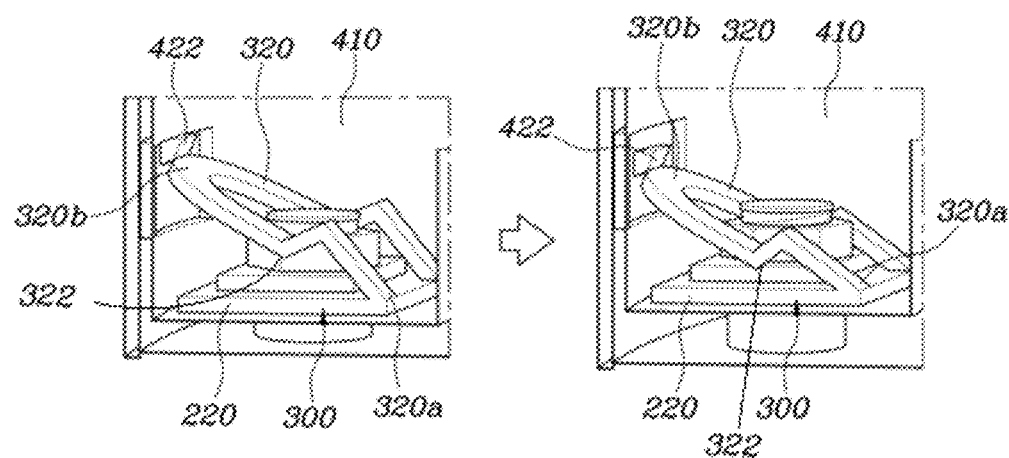
FIG. 7 is a view illustrating an operation of pressing the spring by a pressing protrusion according to the present disclosure.

FIG. 6 is a separated or exploded view illustrating the airbag module 400 according to the present disclosure. FIG. 7 is a view illustrating an operation of pressing the spring 300 by a pressing protrusion 422 according to the present disclosure.

Referring to FIGS. 6 and 7, the pressing protrusion 422 is formed on the inner surface of the airbag cover 420. The space between the pressing protrusion 422 and the spring 300 is opened to press the spring 300 by the pressing protrusion 422.

For example, a portion of the airbag housing 410, overlapping with the pressing protrusion 422, is formed to be elongated in the vertical and longitudinal direction so that the pressing protrusion 422 is exposed inside the airbag housing 410.

In addition, the end (a free end 320b) of the elastic deformation part 320 that is toward the inner surface of the airbag housing 410 is positioned at the lower end of the pressing protrusion 422.

Accordingly, when the airbag cover 420 moves downward, the free end 320b of the elastic deformation part 320 is pressed downward by the pressing protrusion 422 so that the free end 320b of the elastic deformation part 320 rotates downwardly around the fixed end 320a and is moved. As a result, the contact part 322 comes into contact with the electric conduction connection member 220.

Figure 8:
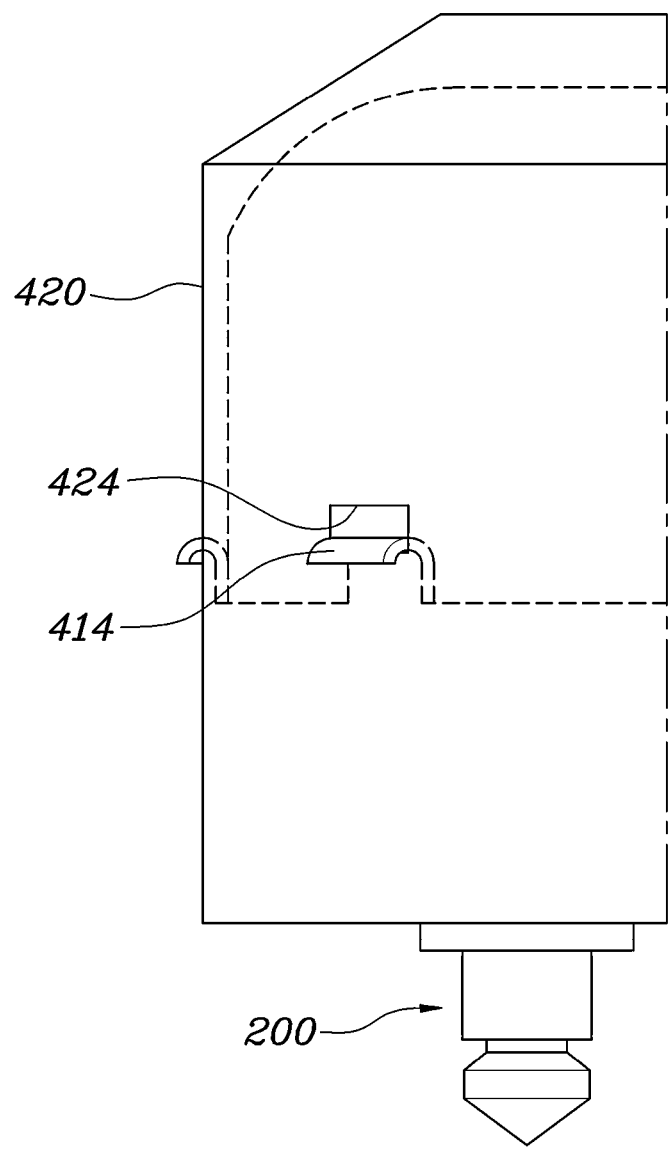
FIG. 8 is a view illustrating a form in which a hook is hung on a hooking hole according to the present disclosure.
Figure 9:
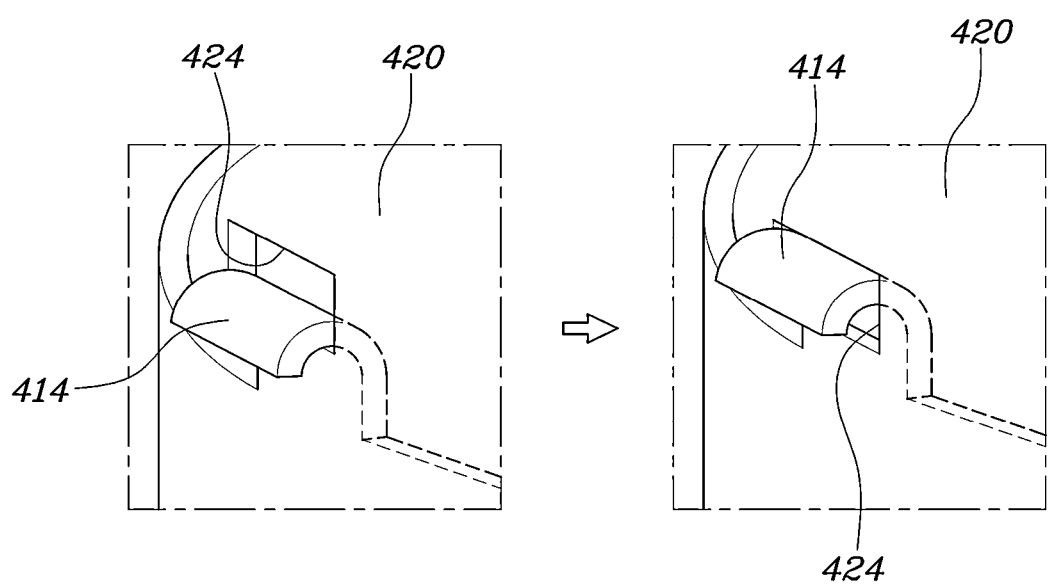
FIG. 9 is a view illustrating an operation of moving the airbag cover by moving the hook in the hooking hole according to the present disclosure.

FIG. 8 is a view illustrating a form in which a hook 414 is hung on a hooking hole 424, according to the present disclosure. FIG. 9 is a view illustrating an operation of moving the airbag cover 420 by moving the hook 414 in the hooking hole 424, according to the present disclosure.

Referring to FIGS. 8 and 9, the hook 414 is formed on the edge of the airbag housing 410, and the hooking hole 424 is formed at a position of the airbag cover 420 corresponding to the hook 414 so that the hook 414 fits into the hooking hole 424. At this time, the height of the hooking hole 424 is formed longer than the cross-sectional height of the hook 414 that fits into the hooking hole 424 so that the airbag cover 420 may move up and down.

For example, the hooking hole 424 is formed in the portion of the airbag cover 420 that overlaps the hook 414. As the vertical length of the hooking hole 424 is formed to be longer than the vertical length of the hook 414 that fits into the hooking hole 424, the airbag cover 420 moves up and down within the vertical length section of the hooking hole 424.

At this time, the vertical displacement of the airbag cover 420 may be sufficient as long as it is a length greater than or equal to the length from the point at which the pressing protrusion 422 presses the elastic deformation part 320 to the point where the contact part 322 of the elastic deformation part 320 contacts the electric conduction connection member 220.

The damper unit 10 of the steering wheel 500 of the present disclosure may include: the damper 100 made of insulating material coupled to the airbag housing 410; the switch assembly 200 coupled to the airbag housing 410 via the damper 100 and coupled to the steering wheel 500 so as to be continuously energized; and a spring 300. The spring 300 is elastically deformed according to the movement of the horn operation direction of the airbag cover 420 and is selectively energized depending on whether or not the spring 300 is in contact with the switch assembly 200.

Hereinafter, a process of assembling the spring 300 and the switch assembly 200 to the airbag is described with reference to FIGS. 10A-10E.

Figure 10A:
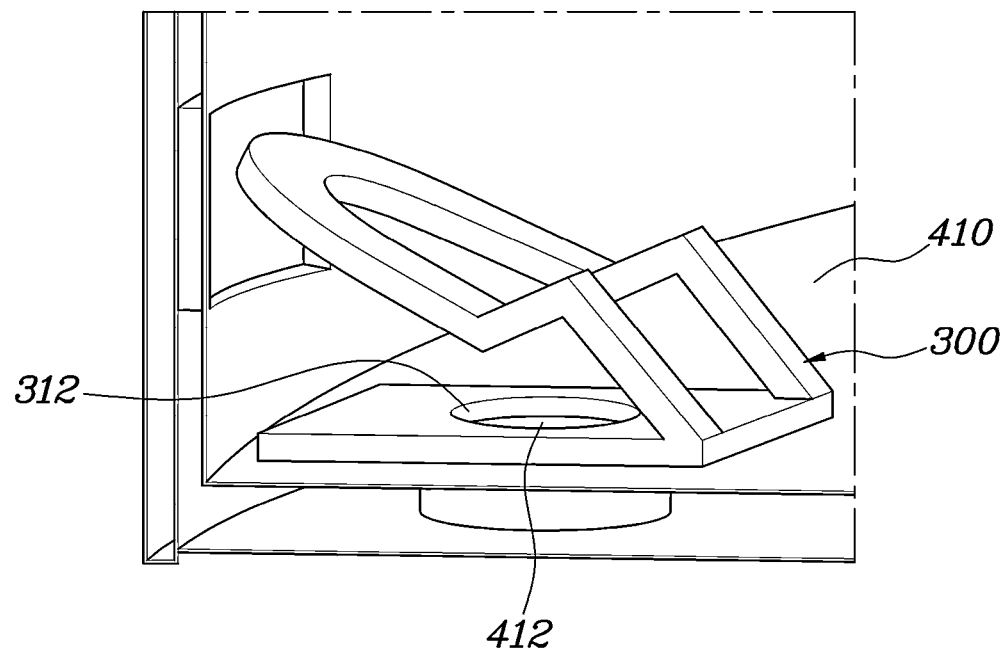
FIGS. 10A-10E are views illustrating an assembly process of the switch assembly according to the present disclosure.

First, as shown in FIG. 10A, the spring 300 is mounted on the airbag housing 410 in a state in which the damper support hole 312, formed in the spring 300, is aligned with the damper mounting hole 412 that is formed in the airbag housing 410.

Figure 10B:
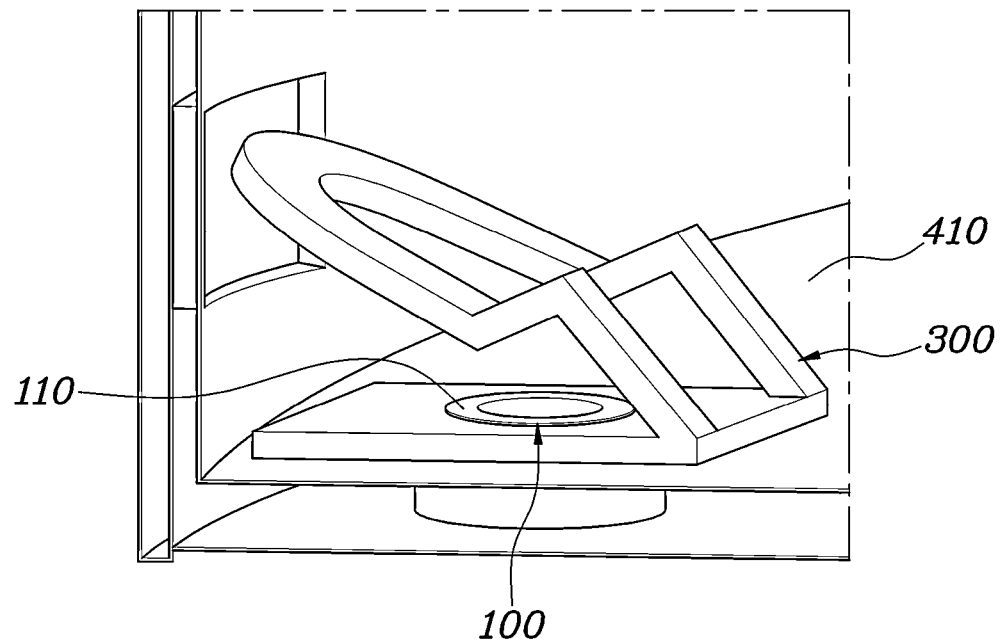

Then, as shown in FIG. 10B, while inserting the damper 100 through the damper mounting hole 412 and the damper support hole 312, the upper insulating part 110 of the upper end of the damper 100 is supported by the upper edge of the damper support hole 312. Furthermore, the lower insulating part 120 of the lower part of the damper 100 is supported by the lower edge of the damper mounting hole 412.

Figure 10C:
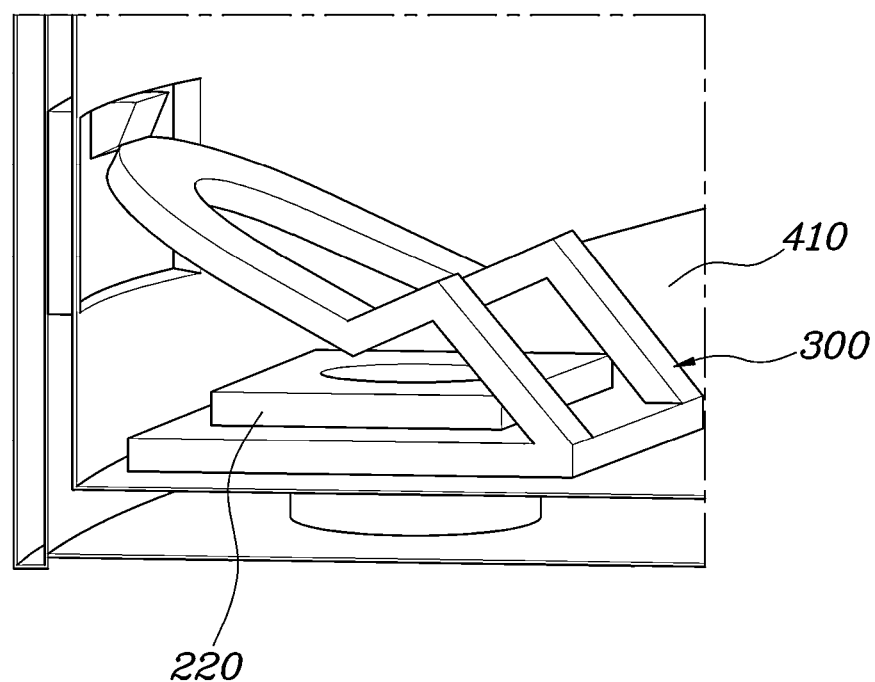

Then, as shown in FIG. 10C, the electric conduction connection member 220 is pushed into the space between the base part 310 of the spring 300 and the elastic deformation part 320 to match the hole of the electric conduction connection member 220 with the hole in the center of the damper 100.

Figure 10D:
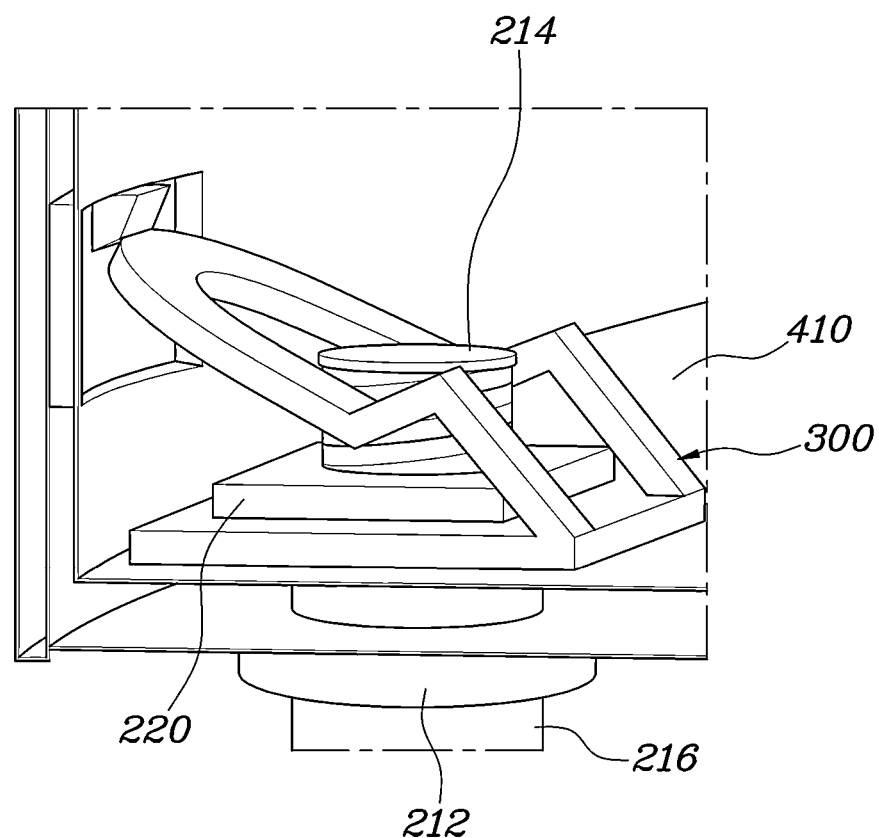

Then, as shown in FIG. 10D, the fixing part 214 of the upper end of the electric conduction pin 210 is inserted through the damper 100 from the lower part to the upper part. The flange 212 of the electric conduction pin 210 is supported on the lower surface of the lower insulating part 120 at the lower end of the damper 100.

Figure 10E:
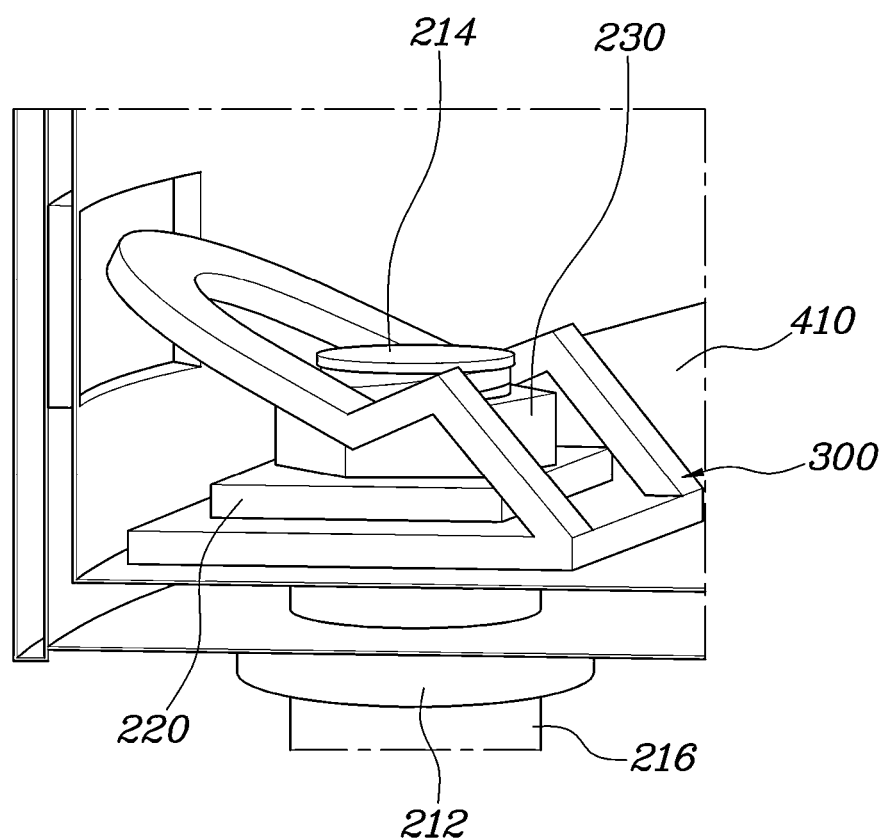

Then, as shown in FIG. 10E, by fastening the nut 230 to the screw part formed on the upper end of the fixing part 214, the damper unit 10, which includes the damper 100, the switch assembly 200, and the spring 300, is assembled to the airbag housing 410.

As described above, since the horn switch structure includes the switch assembly 200, the spring 300, and the damper 100 for damping vibrations, which are integrated into the damper unit 10, there is no need to install a separate damper. Thus, the degrees of freedom in the space of the steering wheel 500 may be secured, and cost may be reduced. In addition, noise-vibration-harshness (NVH) performance may be improved by ensuring excellent damping performance without additional dampers.

Furthermore, by operating the horn by moving only the airbag cover 420 without moving the entire airbag module 400, the interference between the airbag module 400 and the horn wire is fundamentally prevented, thereby improving horn operability.

Although the present disclosure has been shown and described with reference to specific embodiments, it should be apparent to those having ordinary skill in the art that the present disclosure may be variously changed and modified without departing from the spirit of the present disclosure as defined in the appended claims.

What is claimed is:

1. A steering wheel, comprising:
   an airbag cover configured to move, when a horn is activated, in a horn operation direction with respect to an airbag housing; and
   a damper unit including
      a damper made of an insulating material and coupled to an airbag housing,
      a switch assembly coupled to the airbag housing in an insulating state via the damper and coupled to the steering wheel so as to be continuously energized, and
      a spring coupled to the airbag housing to be continuously energized and selectively electrically conducted with the switch assembly depending on whether or not the airbag cover is in contact with the switch assembly due to elastic deformation when the airbag cover moves in the horn operation direction,
   wherein the switch assembly includes
      an electric conduction pin supported on an underside of the damper by expanding a flange in a radial direction, the flange having an upper end passing through the damper and a lower end connected to the steering wheel, and
      an electric conduction connection member coupled to the upper end of the flange so as to be supported on an upper side of the damper, and to which the spring that is elastically deformable is selectively contacted,
   wherein the spring includes
      a base part supported between a bottom surface of the airbag housing and the damper, and
      an elastic deformation part configured to be inclined in an upward direction toward the airbag cover at an end of the base part and to be pressed by the airbag cover so as to be elastically deformed vertically around the end of the base part, and
   wherein a contact part is provided by being bent in a shape protruding toward the base part in a middle of the elastic deformation part so as to come into contact with the electric conduction connection member of the switch assembly positioned between the base part and the elastic deformation part.

2. The steering wheel of claim 1, wherein the damper is coupled to the airbag housing by penetrating the airbag housing, and wherein the switch assembly is coupled to the damper by penetrating the damper.

3. The steering wheel of claim 2, wherein a damper mounting hole is provided in a bottom surface of the airbag housing, wherein the damper is inserted into the damper mounting hole, and wherein upper and lower insulating parts are provided by being expanded on upper and lower edges of the damper in radial directions to be supported on upper and lower ends of the damper mounting hole, respectively.

4. The steering wheel of claim 1, wherein
   assembly mounting holes are formed on a bottom surface of the steering wheel while being spaced out radially angularly so that the switch assembly is inserted into each of the assembly mounting holes,
   a fastening groove is formed on an outer surface of the switch assembly, and
   a ring spring is fitted over the fastening groove to provide an elastic force pushing the switch assembly in an outer radial direction.

5. The steering wheel of claim 4, wherein a support stopper is provided by protruding from an upper edge of each of the assembly mounting holes in the outer radial direction.

6. The steering wheel of claim 1, wherein the spring is configured in a shape of a leaf spring.

7. The steering wheel of claim 1, wherein a pressing protrusion is provided on an inner surface of the airbag cover, and wherein a space between the pressing protrusion and the spring is opened to press the spring by the pressing protrusion.

8. The steering wheel of claim 1, wherein
   a hook is provided on an edge of the airbag housing,
   a hooking hole is provided at a position of the airbag cover corresponding to the hook, so that the hook is fitted into the hooking hole, and
   a height of the hooking hole is configured to be longer than a cross-sectional height of the hook fitted into the hooking hole so that the airbag cover moves up and down.

9. A damper unit of a steering wheel, the damper unit comprising:
   a damper made of an insulating material and coupled to an airbag housing;
   a switch assembly coupled to the airbag housing in an insulating state via the damper and coupled to the steering wheel so as to be continuously energized; and
   a spring coupled to the airbag housing to be continuously energized and selectively electrically conducted with the switch assembly depending on whether or not the airbag cover is in contact with the switch assembly due to elastic deformation when the airbag cover moves in a horn operation direction,
   wherein the switch assembly includes
      an electric conduction pin supported on an underside of the damper by expanding a flange in a radial direction, the flange having an upper end passing through the damper and a lower end connected to the steering wheel, and
      an electric conduction connection member coupled to the upper end of the flange so as to be supported on an upper side of the damper, and to which the spring that is elastically deformable is selectively contacted,
   wherein the spring includes
      a base part supported between a bottom surface of the airbag housing and the damper, and
      an elastic deformation part configured to be inclined in an upward direction toward the airbag cover at an end of the base part and to be pressed by the airbag cover so as to be elastically deformed vertically around the end of the base part, and
   wherein a contact part is provided by being bent in a shape protruding toward the base part in a middle of the elastic deformation part so as to come into contact with the electric conduction connection member of the switch assembly positioned between the base part and the elastic deformation part.

* * * * *